United States Patent [19]

Shirai

[11] Patent Number: 6,049,988
[45] Date of Patent: Apr. 18, 2000

[54] LINEAR MOTION GUIDING APPARATUS

[75] Inventor: Takeki Shirai, Tokyo-to, Japan

[73] Assignee: THK Co., Ltd., Tokyo-to, Japan

[21] Appl. No.: 09/105,194

[22] Filed: Jun. 26, 1998

[30] Foreign Application Priority Data

Jul. 9, 1997 [JP] Japan ..................................... 9-199338

[51] Int. Cl.$^7$ .................................................... G01B 5/00
[52] U.S. Cl. ............................................................ 33/1 M
[58] Field of Search ........................... 33/1 M, 613, 645, 33/549; 248/424, 429, 430; 269/55; 108/102

[56] References Cited

U.S. PATENT DOCUMENTS

| | | | |
|---|---|---|---|
| 5,042,162 | 8/1991 | Helms | 33/1 M |
| 5,326,335 | 7/1994 | Takei | 33/1 M |
| 5,413,523 | 5/1995 | Tsai | 269/55 |

FOREIGN PATENT DOCUMENTS 62-251602  11/1987  Japan ...................................... 33/1 M

WO 93/21639  10/1993  WIPO ..................................... 33/1 M

*Primary Examiner*—G. Bradley Bennett
*Attorney, Agent, or Firm*—Young & Thompson

[57] ABSTRACT

A guide rail has two roller running surfaces and two ball running grooves. A movable block has a horizontal member facing the upper surface of the guide rail and wing members respectively facing the side surfaces of the guide rail. The horizontal member has on its under surface two roller running counter-surfaces corresponding to the two roller running surfaces of the guide rail. Each of the wing members has on its inner surface two ball running counter-grooves corresponding to the two ball running grooves of the guide rail. Two trains of rollers are arranged between the two roller running surfaces and the two roller running counter-surfaces, respectively, so as to be rollable. Two trains of balls are arranged between the two ball running grooves and the two ball running counter-grooves, in each of gaps between the side surfaces of the guide rail and the inner surfaces of the wing members, so as to be rollable.

12 Claims, 5 Drawing Sheets

LINEAR MOTION GUIDING APPARATUS

BACKGROUND OF THE INVENTION

1. Field of the Invention

The present invention relates to a linear motion guiding apparatus for a heavy load, in which rollers and balls are used as rolling members in combination.

2. Description of the Related Art

Figures 5A, 5B, 5C, 5D, 5E:
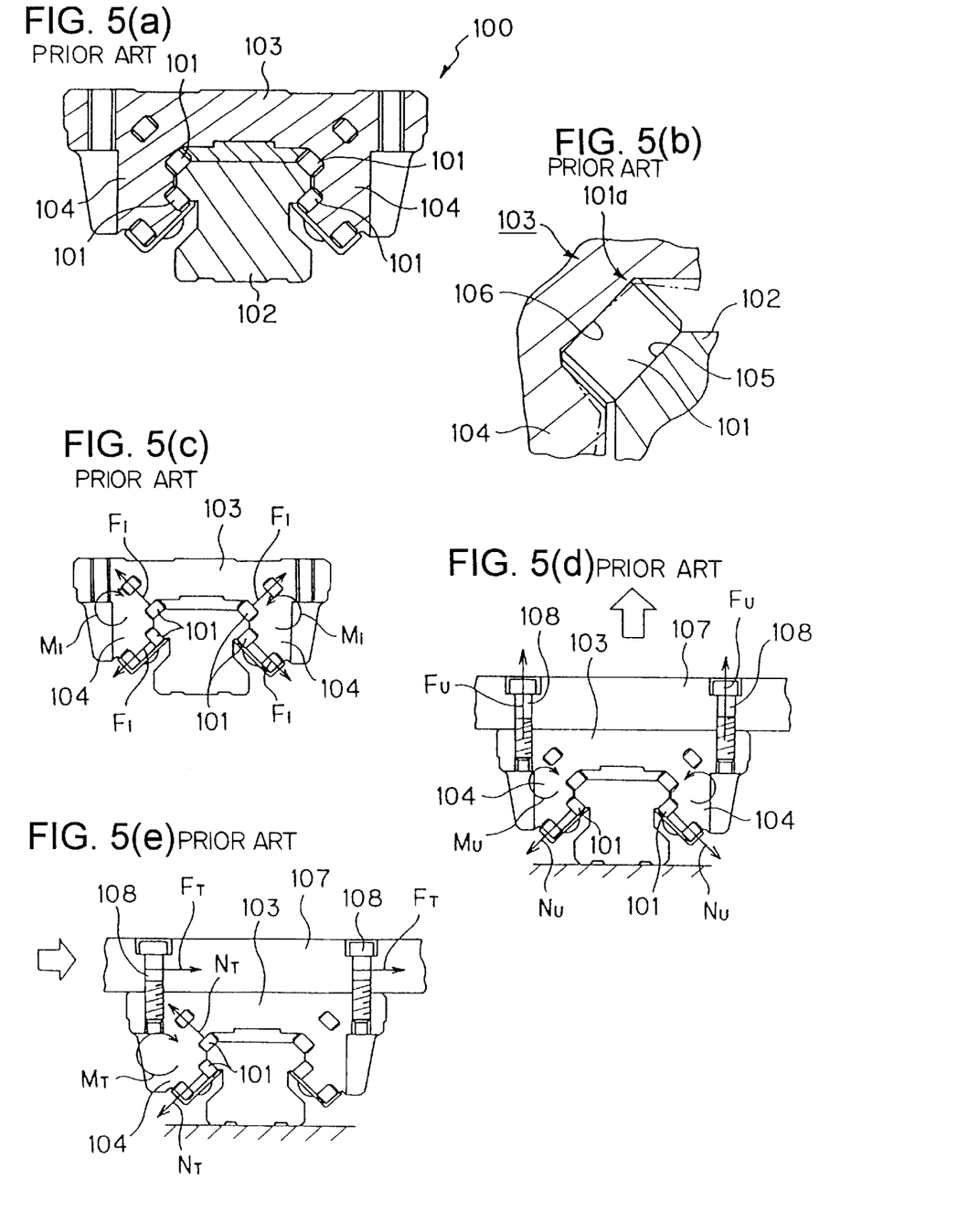

With respect to a conventional linear motion guiding apparatus for a heavy load, there is known a linear roller guiding apparatus, in which a plurality of trains of rolling members are composed only of rollers 101 as shown in example in FIG. 5(a).

More specifically, in such a linear roller guiding apparatus, a movable block 103 is movably guided along a guide rail 102 through the rollers 101, 101, 101, 101, which are arranged to form two trains of rollers on each of the right and left-hand side surfaces of the guide rail 102 so as to provide the total number of trains of four.

Such a full-roller type linear motion guiding apparatus however has problems that a pre-load applied to the rollers 101, an inverse radial load (a lifting load) having a function of pulling the movable block 103 apart from the upper surface of the guide rail 102 and a transverse load having a function of shifting horizontally the movable block 103 relative to the guide rail 102 may easily cause the right and left-hand wing members 104, 104 of the movable block 103 to be deformed outward so as to be apart from each other under the function of the moment. Such deformation of the wing members 104, 104 makes it impossible to maintain a proper parallelism of the roller running surface 105 of the guide rail 102 and the roller running counter-surface 106 of the movable block 103, between which the rollers are held, as illustrated with exaggeration in FIG. 5(b). Accordingly, a proper linear contact of the roller 101 with these surfaces 105, 106 cannot be maintained with the result that a load concentration may occur on the roller end 101a, thus decreasing the load capacity as well as durability, and making it impossible to bring the ability of the roller 101 into full play.

When a pre-load is applied for example to the roller 101 as shown in FIG. 5(c), the inner surfaces of the both wing members 104 of the movable block 103 are urged by a reaction force Fi of the pre-load of the roller 101, and the moment Mi having the function of expanding the wing members 104, 104 is generated, thus resulting in deformation of the wing members 104, 104.

The inverse radial load Fu is applied to the movable block 103 through a bolt 108 by means of which a member 107 to be guided is fixed to the movable block 103, as shown in FIG. 5(d). The lower rollers 101 arranged on the right and left-hand sides of the guide rail 102 carry the above-mentioned load Fu. Since the bolt 108 to which the load is applied is however apart from the roller 101 in the horizontal direction, the inverse radial load Fu and the reaction force Nu of the contact portion of the roller 101 form a couple of forces, resulting in occurrence of the moment Mu having the function of expanding the wing members 104, 104 so as to cause deformation of the wing members 104, 104.

The transverse load $F_T$ is applied to the movable block 103 through the bolt 108 as shown in FIG. 5(e). The two trains of rollers 101 arranged on the one wing member 104 carries the above-mentioned load $F_T$. Since the bolt 108 to which the load is applied is however apart from the roller 101 in the vertical direction, the moment $M_T$ having the function of expanding the one wing member 104 so as to cause deformation of the wing member 104.

SUMMARY OF THE INVENTION

An object of the present invention is therefore to provide a linear motion guiding apparatus for a heavy load, which permits to maintain a proper linear motion of the movable block, even when the wing members of the movable block are deformed.

In order to attain the aforementioned object, a linear motion guiding apparatus comprises:

a guide rail provided with two roller running surfaces formed on an upper surface of said guide rail and with two ball running grooves formed on each of side surfaces of said guide rail;

a movable block provided with a horizontal member facing the upper surface of said guide rail and with a pair of wing members respectively facing the side surfaces of said guide rail, said horizontal member having on an under surface thereof two roller running counter-surfaces corresponding to said two roller running surfaces of said guide rail, and said each of said wing members having on an inner surface thereof two ball running counter-grooves corresponding to said two ball running grooves of said guide rail;

two trains of rollers arranged between the two roller running surfaces of the upper surface of said guide rail and the two roller running counter-surfaces of the horizontal member of said movable block, respectively, so as to be rollable; and two trains of balls arranged between the two ball running grooves of the side surfaces of said guide rail and the two ball running counter-grooves of the inner surfaces of said wing members, in each of gaps between the side surfaces of said guide rail and the inner surfaces of said wing members, so as to be rollable.

It is preferable to adopt a structure that each of the balls comes at two opposite points thereof into contact with the ball running groove of the guide rail and the ball running counter-groove of the movable block, respectively, and a contact angle line connecting the two opposite points with each other inclines upward toward the guide rail, in consideration of the inverse radial load to be applied to the movable block.

In the above-mentioned present invention, the radial load having a function of pressing the horizontal member of the movable block onto the guide rail can substantially be born by the two trains of rollers arranged on the upper surface of the guide rail. It is therefore possible to provide the linear motion guiding apparatus, which has a smaller size and permits to carry a heavy load.

The inverse radial load having a function of pulling the horizontal member of the movable block apart from the upper surface of the guide rail can be born by the two trains of balls arranged on each of the side surfaces of the guide rail.

When the inverse radial load is applied to the movable block, it is not possible to avoid deformation of the wing members, which is caused by the moment having a function of expanding the wing members. Even when the wing members are thus deformed, the contact angle between the contact angle line of the ball and the horizontal line is slightly changed without causing any inconvenience, since the rolling members arranged on the side surfaces of the guide rail are composed of the balls.

The transverse load having a function of shifting the wing member of the movable block relative to the side surface of the guide rail can substantially be carried on the two trains of balls arranged on the side surface of the guide rail and the wing members are deformed due to the moment having a function of expanding the wing members. Even when the wing members are thus deformed, the contact angle of the ball is slightly changed without causing any inconvenience, since the rolling members arranged on the side surfaces of the guide rail are composed of the balls.

Application of a pre-load to the balls causes the wing members to be deformed due to the moment having a function of expanding the wing members. Even when the wing members are thus deformed, the contact angle of the ball is slightly changed without causing any inconvenience.

Even when the wing members are deformed to be expanded by applying the inverse radial load or the transverse load to the movable block, or applying the pre-load to the balls in this manner, the contact angle of the ball is merely and slightly changed so that the direction of the load, which is carried on the balls is appropriately maintained. The balls can therefore serve as the rolling members within its load capacity, and smooth running of the balls can be maintained. More specifically, the deformation of the wing members of the movable block caused by an application of the inverse radial load can be absorbed by a slight movement of the contact points of the ball with the ball running groove and the ball running counter-groove (i.e., a slight change in the contact angle of the ball), and such deformation does not exert any influence on the load capacity of the ball and the smooth run thereof.

When the moment having a function of expanding the wing members is generated, the other moment having a function of pulling the central portion of the horizontal member of the movable block apart from the member to be guided is simultaneously generated. The horizontal member of the movable block does not however tend to be deformed easily by such a moment, since the upper surface of the horizontal member is firmly fixed to the member to be guided. As a result, there can be maintained a proper condition, in which the roller comes at a linear portion on the periphery thereof into contact with the roller running counter-surface formed on the under surface of the horizontal member of the movable block, thus preventing the occurrence of the load concentration on the roller end.

In general, the roller has a load capacity, which is larger than that of the ball. The inverse radial load can be carried on the four trains of balls, which are composed of two trains of balls arranged on one side surface of the guide rail and the other two trains of balls arranged on the other side surface thereof. The four trains of balls have the equal load capacity to that of the two trains of rollers, which carry the radial load. In addition, the transverse load can be carried on the two trains of balls having a high durability, which is however not as high as the load capacity against the inverse radial load. Such trains of balls provide a sufficient load capacity against the loads in four directions, i.e., the radial direction, the inverse radial direction, and the right and left transverse directions.

In particular, when the load capacity in the radial direction of the roller is predetermined so as to be twice or thrice as much as the load capacity in the inverse radial direction of the ball, the load capacity for the inverse radial load, which is obtained by four trains of balls, can be adjusted so as to be substantially equal to the load capacity for the radial load, which is obtained by two trains of rollers. Although the load capacity for the transverse load, which is obtained only by the two trains of balls is limited to substantially half of the inverse radial load, there can be provided a structure, in which the loads in the four directions, i.e., the radial direction, the inverse radial direction, and the right and left transverse directions are kept equal to each other in approximation. The linear motion guiding apparatus therefore has excellent durability against the loads in any directions, and can be used in any conditions so as to be utilized for various purposes.

When the linear motion guiding apparatus is used as a guiding apparatus for a machine tool, the working table is supported by a plurality of movable blocks. Even in such a mere guidance on a plane, the inverse radial load may be applied to a certain one of the movable blocks. When there is given the load capacity for the inverse radial load, which is substantially identical to the load capacity for the radial load, it is possible to make a simple calculation of durability and a service life, so as to be useful for determination of the mechanical structure.

The present invention also has a feature that the horizontal member of the movable block has bolt-holes, which locate between the two trains of rollers, and outside each of the two trains of rollers, respectively.

The force having a function of expanding the wing members, i.e., the pre-load applied to the ball, or the inverse radial load or the transverse load applied to the movable block simultaneously causes the moment having a function of pulling the central portion of the horizontal member of the movable block apart from the member to be guided such as a working table or the like to expand the wing members, as mentioned above. When the central portion of the horizontal member of the movable block is fixed to the member to be guided, by means of the bolts, it is possible to prevent the horizontal member from being deformed, and to prevent the occurrence of the problem that the roller does not come at a linear portion on the periphery thereof into contact with the roller running counter-surface.

The present invention also has a feature that each of the ball running groove and the ball running counter groove has a radius of curvature, which is smaller than a value of 52 percent of a diameter of the ball.

According to this feature, the differential slip may easily occur, thus improving the damping capacity.

BRIEF DESCRIPTION OF THE DRAWINGS

FIG. 1 (a) is a front cross-sectional view illustrating a linear motion guiding apparatus of the first embodiment of the present invention, and FIG. 1 (b) is a descriptive view illustrating a contact angle of each of a roller and a ball;

FIG. 5(a) is a cross-sectional view illustrating the conventional linear roller guiding apparatus, FIG. 5(b) is a descriptive view exaggeratedly illustrating the condition in which a load is applied to the one end of the roller and FIGS.

5(c) to 5(e) are descriptive views illustrating the conventional linear roller guiding apparatus, to which the load is applied.

DETAILED DESCRIPTION OF THE PREFERRED EMBODIMENTS

Now, embodiments of a linear motion guiding apparatus of the present invention will be described in detail below with reference to the accompanying drawings.

Figure 1A:
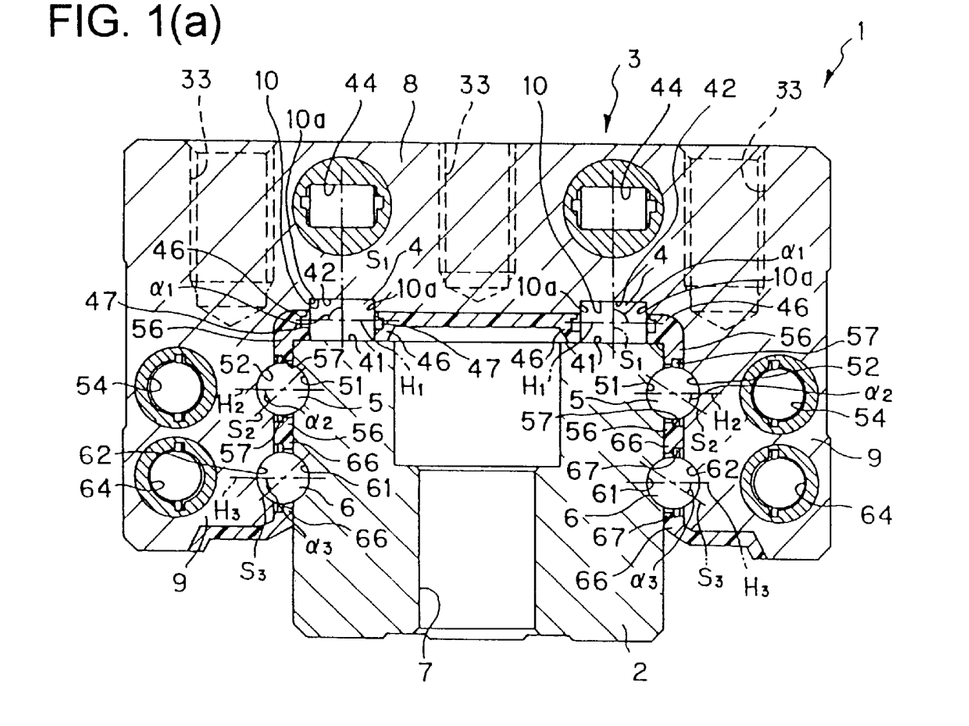
Figure 1B:
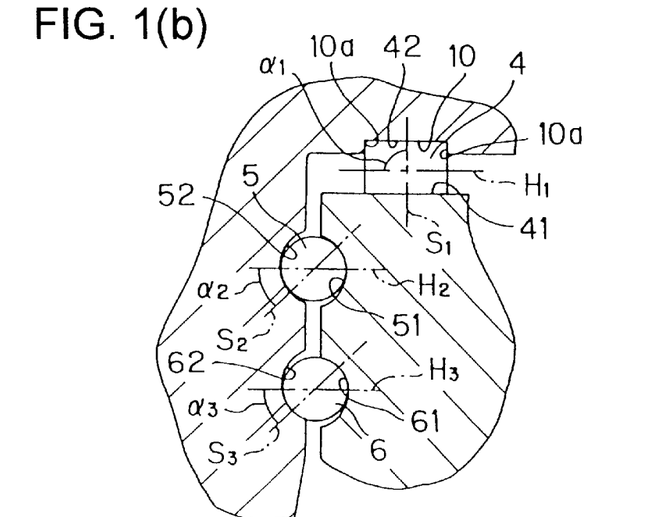

FIGS. 1 and 2 show a linear motion guiding apparatus of one embodiment of the present invention.

The entire structure of the linear motion guiding apparatus is indicated by a reference numeral 1. The apparatus 1 comprises a guide rail 2, a movable block 3 arranged so as to be movable along the guide rail 2, two trains of rollers 4, 4 arranged on the upper surface of the guide rail 2 and two pairs of two trains of balls 5, 6; 5, 6, each pair of which is arranged on each of the right and left-hand side surfaces of the guide rail 2.

The guide rail 2 has a rectangular cross-section. Two roller running surfaces 41, 41 are formed on the upper surface of the guide rail 2, and two ball running grooves 51, 61 are formed on each of the right and left-hand surfaces of the guide rail 2. The two roller running surfaces 41, 41 are located in the vicinity of the side edges of the upper surface of the guide rail 2. The guide rail 2 has a plurality of bolt-holes 7 for securing the guide rail 2, which are formed in the middle portion of the guide rail 2 on the straight line extending in the longitudinal direction of the guide rail 2.

Each of the roller running surfaces 41, 41 is formed as a flat horizontal surface. Each of the ball running grooves 51, 61; 51, 61 is formed, on the other hand, as a so-called circular arc groove having a constant curvature of the arc in its cross section.

The movable block 3 is composed of a horizontal member 8, which faces the upper surface of the guide rail 2, and right and left-hand wing members 9, 9, which extend downward from the both ends of the horizontal member 8 and face the right and left-hand side surfaces of the guide rail 2.

The horizontal member 8 of the movable block 3 has on its under surface two roller running counter-surfaces 42, 42, which correspond to the two roller running surfaces 41, 41 of the guide rail 2. Each of the wing members 9, 9 of the guide rail 2 has on its inner surface two ball running counter-grooves 52, 62, which correspond to the two ball running grooves 51, 61 of the guide rail 2.

Each of the roller running counter-surfaces 42, 42 is defined by the bottom surface of each of roller grooves 10, 10, which are formed on the under surface of the horizontal member 8 and have a rectangular cross section. The roller groove 10 has the right and left-hand side surfaces, which are in parallel with each other and face the both ends of the roller 4 so as to make an extremely small gap between the side surfaces of the roller groove 10 and the both ends of the roller 4. Such side surfaces of the roller groove 10 form roller-end guiding walls 10a, 10a. The roller groove 10 has a depth, which is shorter than the radius of the roller, and in the example as shown in FIGS. 1(a) and 1(b), the depth of the roller groove 10 is equal to half of the radius of the roller 4.

Each of the two ball running counter-grooves 52, 62 on the inner surfaces of the wing members 9, 9 of the movable block 3 is also formed as a so-called circular arc groove having a constant curvature of the arc in its cross section. The ball running grooves 51, 61 of the guide rail 2 and the ball running counter-grooves 52, 62 of the movable block 3 may be formed as a so-called gothic arc groove, in which the inner surface is defined by two arcs in its cross section.

Two trains of rollers 4 are arranged between the roller running surfaces 41 of the guide rail 2 and the roller running counter surfaces 42 on the under surface of the horizontal member 8 of the movable block 3 so as to be run thereon. Two trains of balls 5, 6 are arranged between the ball running grooves 51, 61 of the guide rail 2 and the ball running counter grooves 52, 62 on the inner surfaces of the wing members 9, 9 of the movable block 3 so as to be run therein.

Figure 2A:
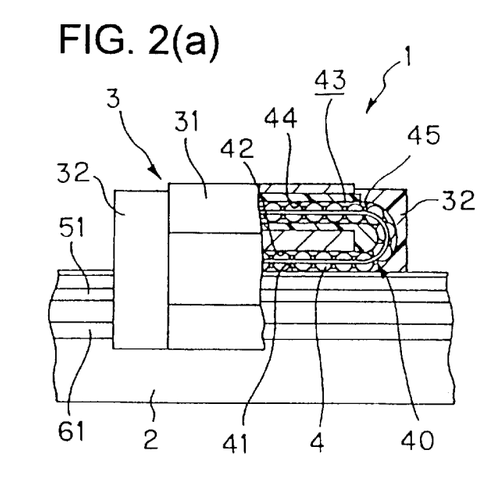
FIG. 2(a) is a side view having a partial cross section of the apparatus as shown in FIG. 1(a)
Figure 2B:
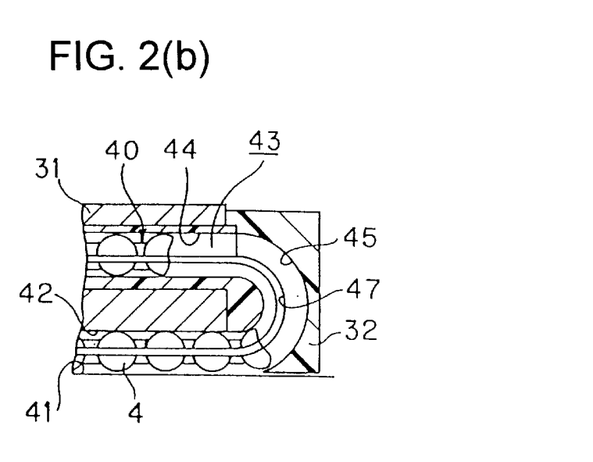
FIG. 2(b) is an enlarged cross-sectional view illustrating the vicinity of a direction changing passage as shown in FIG. 2(a), in which the rollers are omitted.
Figure 2C:
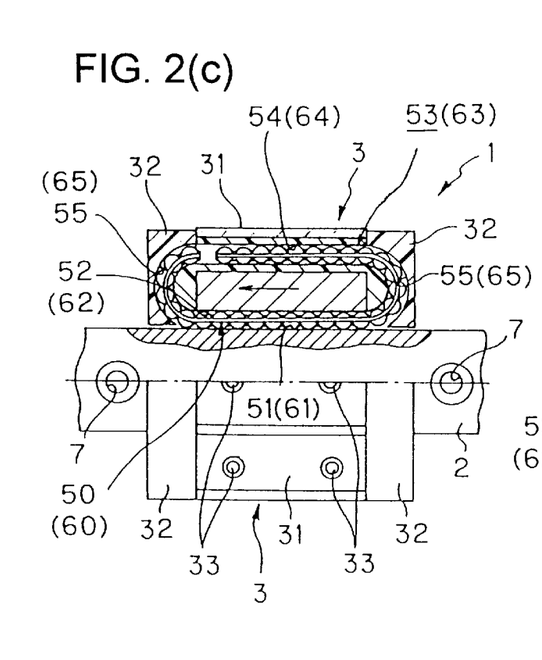
FIG. 2(c) is a plan view having a partial cross section of the apparatus as shown in FIG. 1(a) and FIG. 2(d) is an enlarged cross-sectional view illustrating the vicinity of the direction changing passage as shown in FIG. 2(c), in which the balls are omitted.
Figure 2D:
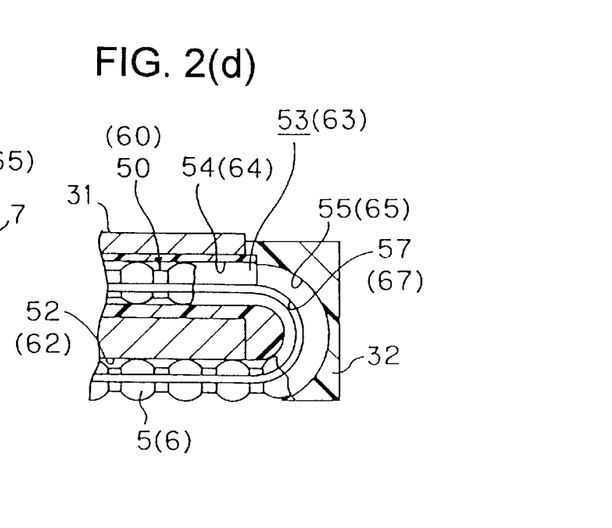

As shown in FIGS. 2(a) and 2(b), the movable block 3 has a roller returning passage 43, in which a load is not applied to the rollers, for circulating the rollers 4 from the one end of the roller running counter surface 42 to the other end thereof. As shown in FIGS. 2(c) and 2(d), the movable block 3 also has ball returning passages 53, 63, in which a load is not applied to the balls, for circulating the balls 5, 6 from the one ends of the respective ball running counter-grooves 52, 62 to the other ends thereof.

As shown in FIGS. 2(a) and 2(b), the roller returning passage 43 is composed of a roller returning hole 44, which is formed in parallel with the roller running surface 41 as a loaded zone, so as to extend linearly in the movable block 3, and a pair of direction changing passages 45, 45 for connecting the ends of the roller running surface 41 with the ends of the roller returning hole 44 to change the running direction of the rollers along a U-shaped passage. A loaded-roller running passage formed between the roller running surface 41 of the guide rail 2 and the roller running counter-surface 42 of the movable block 3, the direction changing passages 45, 45 and the roller returning hole 44 form an endless circulation passage.

As shown in FIG. 2(c), the ball returning passage 53 (63) is composed of a ball returning hole 54 (64), which is formed in parallel with the ball running counter-groove 52 (62), so as to extend linearly in the movable block 3, and a pair of direction changing passages 55, 55 (65, 65) for connecting the ends of the ball running counter-groove 52 (62) with the ends of the ball returning hole 54 (64) to change the running direction of the balls along a U-shaped passage. A loaded-ball running passage formed between the ball running groove 51 (61) of the guide rail 2 and the ball running counter-groove 52 (62) of the movable block 3, the direction changing passages 55, 55 (65, 65) and the ball returning hole 54 (64) form an endless circulation passage.

The movable block 3 is composed of a metallic block body 31 and end plates 32, 32 secured to the both ends of the block body 31. The roller running counter-surface 42 and the roller returning hole 44 are formed in the horizontal member 8 of the block body 31. The ball running counter-grooves 52, 62 and the ball returning holes 54, 64 are formed on each of the wing members 9, 9 of the block body 31. The direction changing passage 45 for the rollers and the direction changing passages 55, 65 for the balls are formed in each of the end plates 32. The roller returning hole 44 linearly passes through the horizontal member 8 of the block body 31. Each of the ball returning holes 54, 64 linearly passes through each of the wing members 9, 9 of the block body 31.

A plurality of bolt-holes 33 are formed on the upper portion of the block body 31 of the movable block 3, which is located between the two trains of rollers 4, so as to be aligned in a line extending in a longitudinal direction of the movable block 3. Another plurality of bolt-holes 33 are formed on the upper portion of the block body 31, which corresponds to the root of the one wing member 9 and located between the ball running counter-groove 52 and the ball returning hole 54, so as to be aligned in a line extending in a longitudinal direction of the movable block 3. A further other plurality of bolt-holes 33 are formed on the upper portion of the block body 31, which corresponds to the root of the other wing member 9 and located between the ball running counter-groove 52 and the ball returning hole 54, so as to be aligned in a line extending in a longitudinal direction of the movable block 3.

A roller contact angle a 1 between a horizontal line H1 passing through the central axis of the roller and a contact angle line S1, which is identical with a normal line of the roller running surface 41 (or the roller running counter surface 42) is maintained so as to be substantially equal to 90 degrees. The roller returning hole 44 is arranged on the above-mentioned contact angle line S1 of the roller 4. The roller 4 may be arranged in an inclined condition so that its central axis intersects the horizontal line. The rollers 4 are not limited to the above-mentioned cylindrical type having a constant diameter, which are to be run on the flat surface, but may be a barrel type having a diameter, which varies in a longitudinal direction of the roller.

With respect to the contact structure of the balls 5, 6 with the ball running grooves 51, 61 and the ball running counter-grooves 52, 62 as shown in FIG. 1(b), the ball 5 (6) comes at two opposite points thereof into contact with the ball running groove 51 (61) and the ball running counter-groove 52 (62), respectively. A contact angle line S2 (S3) connecting the above-mentioned two opposite points with each other inclines upward toward the central portion of the guide rail 2 relative to the horizontal line H2 (H3) passing through the center of the ball 5 (6). The ball returning hole 54 (64) is located at the same level as the ball running counter-groove 52 (62), and namely, is arranged on the horizontal line H2 (H3).

The contact angle α2 between the contact angle line S2 and the horizontal line H2 is identical to the contact angle α3 between the contact angle line S3 and the horizontal line H3. These contact angles α2 and α3 are maintained so as to be substantially identical to 45 degrees in the embodiment of the present invention. The contact angles α2 and α3 are not limited to the above-mentioned angle of 45 degrees, but may be maintained for example in the range of 30 to 60 degrees. The contact angles α2 and α3 are relatively large, and the ball running grooves 51, 61 and the ball running counter-grooves 52, 62 has a large depth.

It is preferable to limit the radius of curvature of each of the ball running grooves 51, 61 and the ball running counter-grooves 52, 62 within a range of from over 50 to under 52 percent of the diameter of the balls 5, 6. The more preferable value of the above-mentioned radius of curvature is about 51 percent of the diameter of the balls 5, 6. Such a construction causes the differential slip to easily occur, thus improving the damping capacity. In this embodiment, the diameters of the balls 5, 6 are identical with each other, and the radii of curvature of the ball running grooves 51, 61 and the ball running counter-grooves 52, 62 are also identical with each other.

The ball 5 (6) has a diameter, which is larger than the distance between the ball running groove 51 (61) and the ball running countergroove 52 (62) so that a pre-load is applied to the ball 5 (6). A pre-load is also applied to the roller 4, and the balls 5, 6 carry the reaction force of the pre-load applied to the roller 4. More specifically, the reaction force of the pre-load having the function of pulling the horizontal member 8 apart from the guide rail 2, which force is given by the roller 4 is balanced with a vertical component of the reaction force of the pre-load, which is applied to the contact points of the ball 5 (6) with the ball running groove 51 (61) and the ball running counter-groove 52 (62) in a direction of the contact angle line S2 (S3) so that the prescribed contact angle α2 (α3) is maintained. In other words, the contact angles α2, α3 can be de determined by shifting upward the position of the ball running counter-grooves 52, 62 of the wing members 9, 9 of the movable block 3 relative to the ball running grooves 51, 61 of the guide rail 2 by means of the rollers 4, which are arranged to be rollable between the upper surface of the guide rail 2 and the horizontal member 8 of the movable block 3.

The reaction force of the pre-load applied to the balls 5, 6; 5, 6 causes the moment to be applied to the wing members 9, 9 to slightly expand the wing members 9, 9, resulting in slight shift of the balls 5, 6 in the ball running grooves 51, 61 and the ball running counter-grooves 52, 62. The contact angle α2 (α3) is determined in a condition that the pre-load has been applied in this manner. After the determination of the prescribed contact angle of the balls 5, 6, an actual application of the pre-load may be completed. In this case, the contact angle α2 (α3) is slightly changed, and there is however no obstruction in load capacity.

In a place, to which no lifting load is applied and only the radial load and the transverse load are applied, the contact angle α2 (α3) may be determined as zero degrees. There may be adopted a structure that the contact angles α2, α3 gradually decrease so that the contact angle lines S2, S3 gradually get closer to the center of the guide rail, according as the balls 5, 6 move in the longitudinal direction of the guide rail 2. The contact angles α2, α3 may be determined so as to be different from each other.

As shown in FIG. 2, in this embodiment, the rollers 4 are connected with each other in the form of chain by means of a flexible roller connector 40, and the balls 5, 6 are also connected with each other in the form of chain by means of flexible ball connectors 50, 60, respectively.

Figures 3A, 3B, 3C, 3D, 3E, 3F, 3G, 3H:
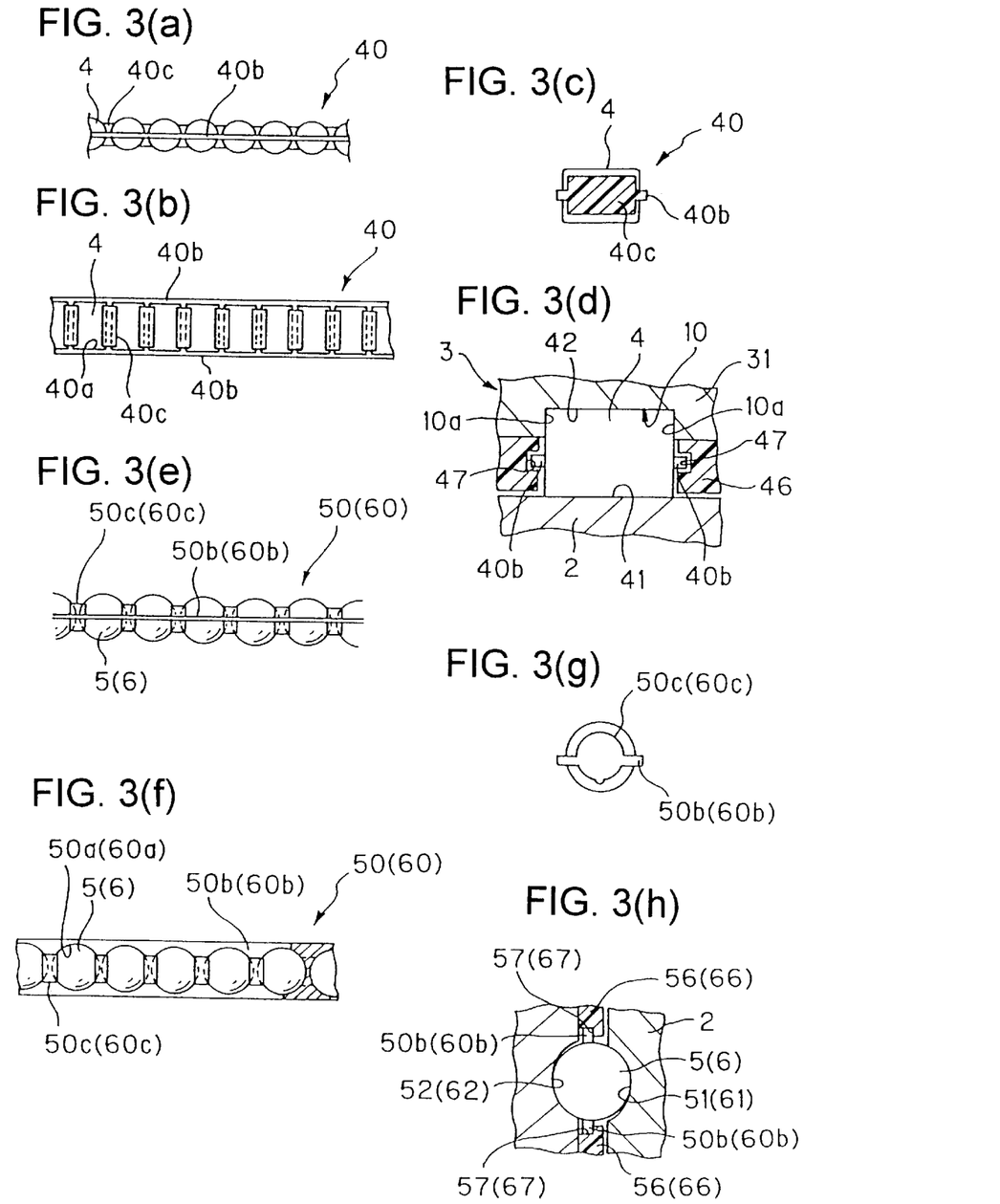
FIGS. 3(a) to 3(h) are descriptive views illustrating a roller connector and a ball connector, which are used in the apparatus as shown in FIG. 1(a)

As shown in FIGS. 3(a) to 3(c), the roller connector 40 is composed of a pair of flexible belts 40b and a plurality of spacing portions 40c, each of which is arranged between the flexible belts 40b. The adjacent two spacing portions 40c, 40c form a roller-hole 40a, in which the roller 4 is received. The contact surface of the spacing portion 40c with the roller 4 is formed into a concave shape, which corresponds to the cylindrical peripheral surface of the roller 4 so that the roller 4 can be held between the adjacent two spacing portions 40c, 40c.

As shown in FIGS. 3(e) to 3(g), the ball connector 50 (60) is composed of a pair of flexible belts 50b (60b) and a plurality of spacing portions 50c (60c), each of which is arranged between the flexible belts 50b (60b). The adjacent two spacing portions 50c, 50c (60c, 60c) form a ball-hole 50a (60a), in which the ball 5 (6) is received. The contact surface of the spacing portion 50c (60c) with the ball 5 (6) is formed into a concave shape, which corresponds to the spherical surface of the ball 5 (6) so that the ball 5 (6) can be held between the adjacent two spacing portions 50c, 50c (60c, 60c).

Each of the above-described roller connector 40 and the ball connector 50 (60) has the opposite terminal ends, thus revealing a strip-shaped belt. These connectors 40, 50 (60) may however be formed into an endless belt by connecting their opposite terminal ends with each other.

The roller connector 40 or the ball connector 50 (60) has the fundamental function of causing the roller 4 or the balls 5, 6 to be rolled smoothly and silently.

The rolling of the roller 4 will be explained below for example. When the movable block 3 is moved along the guide rail 2, the rollers 4 arranged between the roller running surface 41 and the roller running counter-surface 42 in the loaded zone are rolled to run on the roller running surface 41 of the guide rail 2 in the travelling direction of the movable block 3, while the rollers 4 are retained by means of the roller connector 40. One of the rollers 4 is pushed out in sequence from the rear end of the roller running counter-surface 42 of the block body 31 to the direction changing passage 45 as a non-loaded area. The roller 4 thus pushed out enters the roller returning hole 44 from the rear end thereof and is then pushed to run in the travelling direction of the movable block 3. The pushed roller 4 moves from the front end of the roller returning hole 44 to the direction changing passage 45, and then moves from the front end of the movable block to the roller running surface 41 and the roller running counter-surface 42.

When the roller connector 40 is not used, the rollers 3 in the roller returning passage 43 are pushed in sequence to enter the front end of the roller running counter-surface 42 by thrust of the roller 3, which is pushed out from the rear end of the roller running surface 41 and the roller running counter-surface 42 as the loaded zone. When the roller connector 40 is used, the rollers 4 are apart from each other by means of the spacing portions 40c, with the result that the rollers 4 are pushed out without having a collision with each other, while being retained in an alignment by means of the roller connector 40. The rollers 4 are sequentially drawn into the front end of the roller running surface 41 and the roller running counter-surface 42 as the loaded zone by means of the roller connector 40, thus permitting the smooth transfer of the rollers 4 into the loaded zone. The ball connectors 50, 60 have the same function as that of the above-described roller connector 40.

A roller connector retaining member 46 for guiding the roller connector 40 is arranged on the longitudinal opposite edges of the roller running counter-surface 42 formed as the loaded zone on the under surface of the horizontal member 8 of the block body 31, as shown in FIG. 1(*a*) and FIG. 3(*d*). Ball connector retaining members 56, 66 for guiding the ball connectors 50, 60 are arranged on the longitudinal opposite edges of the ball running counter-grooves 52, 62 formed on the respective inner surfaces of the wing members 9, 9, as shown in FIG. 1(*a*) and FIG. 3(*h*).

The roller connector retaining member 46 is formed of resin so as to be integrally formed with the under surface of the horizontal member 8 of the block body 31. The roller connector retaining member 35 is provided with a pair of guide grooves 47, 47, in which the side edge portions of the belt 40b, which project from the both ends of the roller 4, are inserted. In the example as shown in FIG. 1(*a*) and FIG. 3(*d*), a resin-formed body having the guide grooves 47, 47 is used. As shown in FIG. 2(*b*), another pair of guide grooves 47, 47 for guiding the side edge portions of the roller connector 40 are also continuously formed on the direction changing passage 44 for the roller and the roller returning hole 45 as the non-loaded zones.

The roller connector retaining member 46 prevents the roller connector 40 from being sagged from the movable block 3, when the movable block 3 is removed from the guide rail 2. The spacing portions 40c, 40c of the roller connector 40 prevent the rollers 4 from coming off the roller connector 40.

According to the conventional method, the rollers are retained on its tapered peripheral end edges by a retainer in order to prevent the rollers from coming off the retainer. In such a case, the length of the contact portion of the roller with the roller running surface is decreased by the total length of the tapered end edges, thus reducing a load capacity. The construction based on this embodiment, that the roller connector 40 is retained by the roller connector retaining member 46 and the roller connector 40 prevents the rollers 4 from coming off the roller connector 40, permits to utilize effectively the entire length of the roller, thus preventing the reduction of the load capacity.

The ball connector retaining member 56 (66) is formed of resin so as to be integrally formed with the inner surface of the wing member 9 of the block body 31. The ball connector retaining member 56 (66) is provided with a pair of guide grooves 57, 57 (67, 67), in which the side edge portions of the belt 50b (60b), which project from the both ends of the ball 5 (6), are inserted. In the example as shown in FIG. 1(*a*) and FIG.3(*h*), the guide grooves 57, 57 (67, 67) are defined by the metallic block body 31. As shown in FIG. 2(*d*), another pair of guide grooves 57, 57 (67, 67) for guiding the side edge portions of the ball connector 50 (60) are also continuously formed on the ball returning hole 54 (64) and the direction changing passage 55 (65) for the ball as the non-loaded zones.

The ball connector retaining member 56 (66) also prevents the ball connector 50 (60) from being sagged from the movable block 3, when the movable block 3 is removed from the guide rail 2. The spacing portions 50c, 50c (60c, 60c) of the ball connector 50 (60) prevent the balls 5 (6) from coming off the ball connector 50 (60). The distance between each of the side surfaces of the guide rail 2 and the inner surface of each of the wing members 9, 9 of the movable block 3 is smaller than the diameter of a circle defined by the adjacent two spacing portions 50c, 50c (60c, 60c) so that the depth of each of the ball running grooves 51, 61 and the ball running counter-grooves 52, 62 is made as deep as possible, thus increasing the contact angles $\alpha 2, \alpha 3$.

Figures 4A, 4B, 4C, 4D:
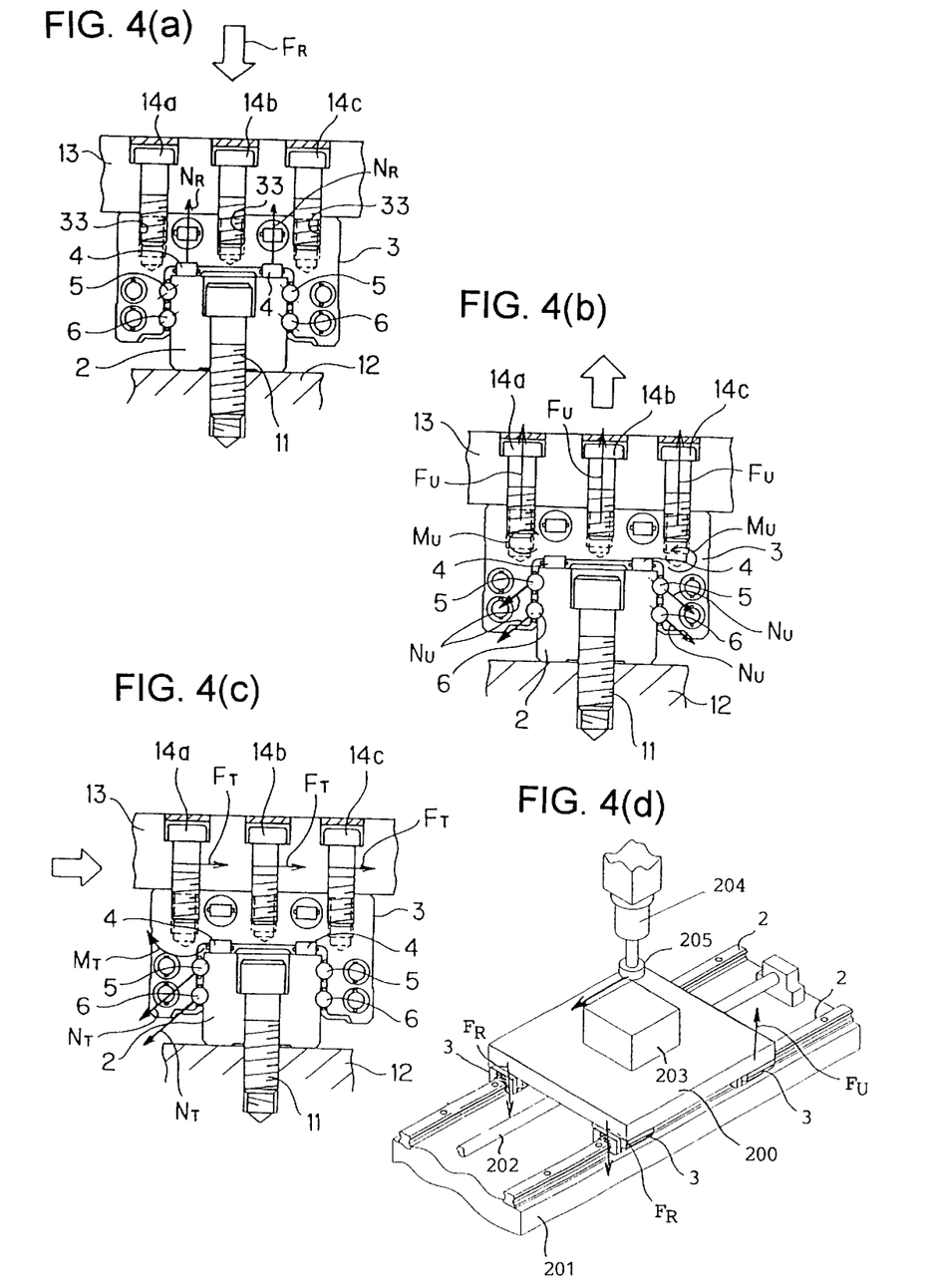
FIGS. 4(a) to 4(d) are descriptive views illustrating the linear motion guiding apparatus as shown in FIG. 1(a), to which a load is applied.

The linear motion guiding apparatus having the above-described structure is used in a condition that the guide rail 2 is secured to a base 12 by means of bolts 11 and a member 13 to be guided such as a table is secured on the upper surface of the movable block 3 by means of bolts 14a, 14b, 14c, as shown in FIG. 4.

FIGS. 4(*a*) to 4(*d*) are descriptive views illustrating the linear motion guiding apparatus, to which loads are applied in several directions.

When a radial load $F_R$ having the function of urging the movable block 3 against the guide rail 2 is applied as shown in FIG. 4(*a*), the radial load $F_R$ is carried on the rollers 4, 4 having a high rigidity. A heavy load in the radial direction can be supported by these rollers 4, 4. In this embodiment, the high rigidity of the rollers 4, 4 can fully be utilized, since the contact angle $\alpha 1$ is determined as 90 degrees and the rollers are retained by means of the roller connector 40 so that the contact length of the roller 4 with the roller running surface 41 and the roller running counter-surface 42 is substantially identical to the entire length of the roller 4. The balls 5, 6; 5, 6 do not carry the radial load as described above due to the contact angle maintained properly.

FIG. 4(*b*) illustrates a condition that an inverse radial load Fu having the function of pulling the movable block 3 apart from the guide rail 2 is applied. The inverse radial load Fu is carried on the four trains of balls 5, 6; 5, 6.

When the inverse radial load Fu is applied to the movable block, since the bolts 14a, 14c by which the movable block 3 is secured to the member 13 to be guided are apart from the balls 5, 6 in the horizontal direction, the inverse radial load Fu (i.e., the lifting load) applied through the bolts 14a, 14c and the reaction force Nu of the contact portion of the balls 5, 6 form a couple of forces, resulting in occurrence of the moment Mu having the function of expanding the wing members 9, 9 so as to cause deformation of the wing members 9, 9. Even when the wing members 9, 9 are expanded in this manner, the contact angles α2, α3 are merely changed, thus causing any problem, since what is arranged on the inside surface of the wing member 9 are the balls 5, 6. More specifically, relative displacement of the ball running counter-grooves 52, 62 to the ball running grooves 51, 61 is absorbed by the shift of the contact points of the balls 5, 6 with these grooves.

The above-mentioned moment Mu causes generation of a force having the function of pulling the central portion of the horizontal member 8 of the movable block 3 apart from the member 13 to be guided. The roller running counter-surface 41 of the horizontal member 8 is however maintained horizontally without causing variation of the contact condition of the roller 4, since the central portion of the horizontal member 8 is secured to the member 13 to be guided, by means of the bolt 14b. It is therefore possible to maintain a proper condition that the roller 4 comes on its longitudinal linear portion into contact with the roller running counter-surface 41 formed on the under surface of the horizontal member 8, thus preventing the occurrence of a load concentration on the end of the roller 4.

FIG. 4(c) illustrates a condition that a transverse load $F_T$ having the function of transversely urging the movable block 3 against the guide rail 2. The transverse load $F_T$ is applied from the member 13 to be guided to the movable block 3 through the bolt 14. The transverse load $F_T$ is carried on the two trains of balls 5, 6 per side. Since the transverse load $F_T$ is applied to the movable block 3 through the bolt 14, the reaction force applied to the balls 5, 6 forms a couple of forces so as to generate the moment $M_T$ having the function of expanding outward the wing member 9 with the vicinity of the connecting portion of the bolt as a central point, resulting in slight expansion of the wing member 9. Even when the wing member 9 is expanded in this manner, there occurs slight displacement of the balls 5, 6 in the ball running grooves 51, 61 and the ball running counter-grooves 52, 62 and the contact angles α2, α3 are merely changed, thus causing any problem, since what is arranged on the inside surface of the wing member 9 are the balls 5, 6. More specifically, relative displacement of the ball running counter-grooves 52, 62 to the ball running grooves 51, 61 is absorbed by the shift of the contact points of the balls 5, 6 with these grooves.

The above-mentioned moment $M_T$ causes generation of a force having the function of pulling the central portion of the horizontal member 8 of the movable block 3 apart from the member 13 to be guided. The deformation of the horizontal member 8 does not however occur, since the central portion of the horizontal member 8 is secured to the member 13 to be guided, by means of the bolt 14b. It is therefore possible to maintain horizontally the roller running counter-surface 42 formed on the under surface of the horizontal member 8, without causing variation of the contact condition of the roller 4.

Even when the deformation of the wing members 9, 9 occurs in this manner due to the application of the inverse radial load FU or the transverse load $F_T$ to the movable block 3 or the application of the pre-load to the balls 5, 6, the contact angles α2, α3 are merely changed slightly, thus permitting the maintenance of a proper direction of the load, which is carried on the balls 5, 6. The load capacity of the balls 5, 6 is not therefore changed and the smooth run of the balls 5, 6 is also maintained. More specifically, even when the wing members 9, 9 are deformed by the inverse radial load Fu, such deformation is absorbed by the slight shift of the contact points of the balls 5, 6 (i.e., the slight change in contact angle), without exerting any influence on the load capacity and the smooth run of the balls 5, 6.

In general, the roller 4 has the load capacity, which is larger than that of the balls 5, 6. When the load capacity in the radial direction of the roller 4 is determined so as to be twice or thrice as much as the load capacity in the inverse radial direction of the balls 5, 6, and two trains of balls 5, 6, which carry the inverse load (i.e., the lifting load) and the transverse load are arranged on each of the wing members, there can be obtained the load carrying structure in which the loads in the four directions (i.e., the radial direction, the inverse radial direction, and the right and left transverse directions) are equal to each other in approximation. The linear motion guiding apparatus therefore has excellent durability against the loads in any directions, and can be used in any conditions so as to be utilized for various purposes.

More specifically, the radial load is carried on two trains of rollers 4, the inverse radial load Fu is carried on two trains of balls 5, 6; 5, 6 arranged on each of the wing members so as to provide a total number of trains of four, and the transverse load $F_T$ is carried on the respective two trains of balls 5, 6 per side of the guide rail 2. Accordingly, the radial load $F_R$ and the inverse radial load Fu can evenly be carried. The transverse loads $F_T$ in the right and left-hand directions can evenly be carried, although the load capacity of each of the transverse loads becomes half.

With respect to the rolling directional moment load having the function of swinging the movable block 3 with the longitudinal axis of the guide rail 2 as an axis for rolling, such a load can be carried evenly at the right and left-hand sides by means of the single trains of rollers 4 and the two trains of balls 5, 6 per side.

With respect to the pitching directional moment load having the function of swinging the front end of the movable block 3 up and down with the horizontal axis intersecting the longitudinal axis of the movable block 3 at right angles as an axis for pitching, the radial load (i.e., the lifting load) applied to any one of the front and rear ends of the movable block 3 can be carried on the four trains of balls 5, 6; 5, 6, which comprise two trains of balls 5, 6 arranged on each of the right and left-hand sides of the guide rail 2. The radial load applied to the other of the front and rear ends of the movable block 3 can evenly be carried on the two trains of rollers 4, 4.

With respect to the yawing directional moment load having the function of swinging the front end of the movable block 3 right and left with the vertical axis intersecting the longitudinal axis of the movable block 3 at right angles as an axis for yawing, the transverse load applied to any one of the front and rear ends of the movable block 3 can be carried on the two trains of balls 5, 6 arranged on any one of the right and left-hand sides of the guide rail 2. The transverse load applied to the other of the front and rear ends of the movable block 3 can evenly be carried on the other two trains of balls 5, 6 arranged on the other of the right and left-hand sides of the guide rail 2.

The linear motion guiding apparatus therefore has excellent durability against the loads in any directions, and can be used in any conditions so as to be utilized for various purposes, in this way.

FIG. 4(d) exemplifies the linear motion guiding apparatus, which is used as a guiding apparatus for a machine tool.

A plurality of movable blocks 3, 3, 3, 3 are movably arranged on a pair of guide rails 2, 2, which are secured to a base 201 so as to be in parallel with each other. A working table 200 is secured to the movable blocks 3, 3, 3, 3 so as to be linearly moved by means of a feeding mechanism such as a ball screw. A work piece 203 is stationarily placed on the working table 200 so that a working such as a cutting can be applied to the work piece 203 by means of a tool 205 stationarily held on a spindle 204.

In such a case where the linear motion guiding apparatus is used for guiding the working table 200, application of a horizontal directional force from the tool 205 to the work piece 203 for example causes a reaction force to be generated so that the radial load $F_R$ is applied to some of the movable blocks 3, 3 and the inverse radial load Fu is applied to the other movable blocks 3, 3. Not only the radial load $F_R$, but also the inverse radial load Fu and the transverse load $F_T$ are applied to the movable blocks 3, 3, 3, 3 in this manner. When the linear motion guiding apparatus has a structure, in which the loads in the four directions, i.e., the radial direction, the inverse radial direction, and the right and left transverse directions are kept equal to each other in approximation, it is possible to make a simple calculation of durability and a service life, so as to be useful for determination of the mechanical structure.

According to the present invention as described in detail, it is possible to carry the heavy load in the radial direction by arranging two trains of rollers between the upper surface of the guide rail and the under surface of the horizontal member of the movable block, and to carry the heavy load in the transverse direction and the inverse radial direction by arranging two trains of balls on each of the right and left-hand sides of the guide rail.

Even when the wing members of the movable block are deformed to be expanded by a pre-load, which is applied to the balls arranged at the inner surface side of the wing member of the movable block or an inverse radial load or a transverse load, which is applied to the movable block, the contact angle of the ball is merely and slightly changed so that the direction of the load, which is carried on the balls is appropriately maintained. Almost no change in load capacity of the ball, which is determined by the contact angle of the ball therefore occurs, and smooth running of the balls can be maintained. More specifically, the deformation of the wing members of the movable block caused by an application of the inverse radial load can be absorbed by a slight movement of the contact points of the ball with the ball running groove and the ball running counter-groove (i.e., a slight change in the contact angle of the ball), and such deformation does not exert any influence on the load capacity of the ball and the smooth run thereof.

In general, the ball has a load capacity, which is smaller than that of the roller. The inverse radial load can be carried on the four trains of balls, which are composed of two trains of balls arranged on one side surface of the guide rail and the other two trains of balls arranged on the other side surface thereof. The four trains of balls have the equal load capacity to that of the two trains of rollers, which carry the radial load. In addition, the transverse load can be carried on the two trains of balls having a high durability, which is however not as high as the load capacity against the inverse radial load. Such trains of balls can carry evenly heavy loads in four directions, i.e., the radial direction, the inverse radial direction, and the right and left transverse directions.

In particular, when the load capacity in the radial direction of the roller is predetermined so as to be twice or thrice as much as the load capacity in the inverse radial direction of the ball, the load capacity for the inverse radial load, which is obtained by four trains of balls can be adjusted so as to be substantially equal to the load capacity for the radial load, which is obtained by two trains of rollers. Although the load capacity for the transverse load, which is obtained only by the two trains of balls is limited to substantially half of the inverse radial load, there can be provided a structure, in which the loads in the four directions, i.e., the radial direction, the inverse radial direction, and the right and left transverse directions are kept equal to each other in approximation. The linear motion guiding apparatus therefore has excellent durability against the loads in any directions, and can be used in any conditions so as to be utilized for various purposes. When the linear motion guiding apparatus is sued as a table guiding apparatus for a machine tool, it is possible to make a simple calculation of durability and a service life, so as to be useful for determination of the mechanical structure.

When each of the ball running groove and the ball running counter groove has a radius of curvature, which is smaller than a value of 52 percent of a diameter of the ball, the differential slip may easily occur, thus improving the damping capacity.

The force having the function of expanding the wing members of the movable block, such as the pre-load applied to the balls, the inverse radial load or the transverse load, which is applied to the movable block causes the simultaneous generation of the moment of pulling the central portion of the horizontal member of the movable block apart from a member to be guided, such as a working table. The central portion of the horizontal member is firmly fixed to the member to be guided, by means of bolts, and it is therefore possible to prevent the deformation of the horizontal member so that there can be maintained a proper condition, in which the roller comes at a linear portion on the periphery thereof into contact with the roller running counter-surface formed on the under surface of the horizontal member of the movable block, thus maintaining a proper durability and a smooth rolling property of the roller.

What is claimed is:

1. A linear motion guiding apparatus comprising:
    a guide rail provided with two roller running surfaces formed on an upper surface of said guide rail and with two ball running grooves formed on each of side surfaces of said guide rail;
    a movable block provided with a horizontal member facing the upper surface of said guide rail and with a pair of wing members respectively facing the side surfaces of said guide rail, said horizontal member having on an under surface thereof two roller running counter-surfaces corresponding to said two roller running surfaces of said guide rail, and said each of said wing members having on an inner surface thereof two ball running counter-grooves corresponding to said two ball running grooves of said guide rail;
    two trains of rollers arranged between the two roller running surfaces of the upper surface of said guide rail and the two roller running counter-surfaces of the horizontal member of said movable block, respectively, so as to be rollable; and
    two trains of balls arranged between the two ball running grooves of the side surfaces of said guide rail and the two ball running counter-grooves of the inner surfaces of said wing members, in each of gaps between the side surfaces of said guide rail and the inner surfaces of said wing members, so as to be rollable.

2. An apparatus as claimed in claim 1, wherein:

each of the balls comes at two opposite points thereof into contact with the ball running groove of the guide rail and the ball running counter-groove of the movable block, respectively, and a contact angle line connecting said two opposite points with each other inclines upward toward said guide rail.

3. An apparatus as claimed in claim 2, wherein:

said contact angle line intersects a horizontal line passing through a center of the ball at an angle of 45 degrees.

4. An apparatus as claimed in claim 1, wherein:

the horizontal member of said movable block has bolt-holes, which locate between the two trains of rollers, and outside each of the two trains of rollers, respectively.

5. An apparatus as claimed in claim 2, wherein:

the horizontal member of said movable block has bolt-holes, which locate between the two trains of rollers, and outside each of the two trains of rollers, respectively.

6. An apparatus as claimed in claim 3, wherein:

the horizontal member of said movable block has bolt-holes, which locate between the two trains of rollers, and outside each of the two trains of rollers, respectively.

7. An apparatus as claimed in claim 1, wherein:

each of the ball running groove and the ball running counter groove has a radius of curvature, which is smaller than a value of 52 percent of a diameter of the ball.

8. An apparatus as claimed in claim 2, wherein:

each of the ball running groove and the ball running counter groove has a radius of curvature, which is smaller than a value of 52 percent of a diameter of the ball.

9. An apparatus as claimed in claim 3, wherein:

each of the ball running groove and the ball running counter groove has a radius of curvature, which is smaller than a value of 52 percent of a diameter of the ball.

10. An apparatus as claimed in claim 4, wherein:

each of the ball running groove and the ball running counter groove has a radius of curvature, which is smaller than a value of 52 percent of a diameter of the ball.

11. An apparatus as claimed in claim 5, wherein:

each of the ball running groove and the ball running counter groove has a radius of curvature, which is smaller than a value of 52 percent of a diameter of the ball.

12. An apparatus as claimed in claim 6, wherein:

each of the ball running groove and the ball running counter groove has a radius of curvature, which is smaller than a value of 52 percent of a diameter of the ball.

* * * * *